(12) United States Patent
Meulendijks et al.

(10) Patent No.: US 11,910,812 B2
(45) Date of Patent: Feb. 27, 2024

(54) METHOD FOR PREPARING FOOD PRODUCTS BY MEANS OF CO-EXTRUSION, VISCOUS GELLING SOLUTION AND SYSTEM FOR CO-EXTRUSION OF FOOD PRODUCTS

(71) Applicant: MAREL FURTHER PROCESSING B.V., Boxmeer (NL)

(72) Inventors: Johannes Martinus Meulendijks, Deurne (NL); Johannes Marinus Quirinus Kools, Oudenbosch (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 31 days.

(21) Appl. No.: 15/568,270

(22) PCT Filed: Apr. 20, 2016

(86) PCT No.: PCT/NL2016/050278
§ 371 (c)(1),
(2) Date: Oct. 20, 2017

(87) PCT Pub. No.: WO2016/171553
PCT Pub. Date: Oct. 27, 2016

(65) Prior Publication Data
US 2018/0295867 A1     Oct. 18, 2018

(30) Foreign Application Priority Data

Apr. 20, 2015  (NL) .................................. 2014679

(51) Int. Cl.
| | |
|---|---|
| *A23L 13/60* | (2016.01) |
| *A23P 30/25* | (2016.01) |
| *A23L 29/256* | (2016.01) |
| *A23L 29/281* | (2016.01) |

(52) U.S. Cl.
CPC .............. *A23L 13/65* (2016.08); *A23L 29/256* (2016.08); *A23L 29/284* (2016.08); *A23P 30/25* (2016.08); *A23V 2002/00* (2013.01)

(58) Field of Classification Search
CPC ...... A23L 13/65; A23L 29/256; A23L 29/284; A23L 30/25; A23V 2002/00; A23P 30/25
USPC ......................................................... 426/277
See application file for complete search history.

(56) References Cited

U.S. PATENT DOCUMENTS

| | | | | |
|---|---|---|---|---|
| 6,089,845 A | * | 7/2000 | Morgan | A22C 13/0016 425/133.1 |
| 2005/0037129 A1 | * | 2/2005 | Newkirk | A23L 13/03 426/646 |
| 2005/0249947 A1 | * | 11/2005 | Wittmann | C08J 3/226 428/357 |
| 2007/0104866 A1 | * | 5/2007 | McClements | A23D 7/0053 427/213.3 |
| 2008/0118607 A1 | * | 5/2008 | Sandoval | A23J 3/26 426/92 |
| 2009/0317522 A1 | * | 12/2009 | Nielsen | A22C 13/0003 426/138 |
| 2010/0034932 A1 | | 2/2010 | Schmidt et al. | |
| 2011/0038782 A1 | * | 2/2011 | Weiss | C01B 15/103 423/415.2 |
| 2015/0030733 A1 | * | 1/2015 | Van De Nieuwelaar | A22C 11/00 426/277 |

FOREIGN PATENT DOCUMENTS

| | | |
|---|---|---|
| NL | 2009121 C | 1/2014 |
| WO | 2015142168 A1 | 9/2015 |

OTHER PUBLICATIONS

NPL Gammage vs mm (Retrieved on Jan. 21, 2009. Used as evidentiary reference). (Year: 2019).*
NPL Xu Z et al. (in Experimental Mechanics 52: 757-769, 2012) (Year: 2012).*
International Search Report from PCT Application No. PCT/NL2016/050278, dated Oct. 24, 2016.
Netherlands Search Report from NL Application No. NL2014679, dated Jan. 14, 2016.

* cited by examiner

*Primary Examiner* — Donald R Spamer
*Assistant Examiner* — Bhaskar Mukhopadhyay
(74) *Attorney, Agent, or Firm* — Workman Nydegger

(57) ABSTRACT

The invention relates to a method for preparing food products by means of co-extrusion, wherein at least two casing material components are mixed to make a viscous gelling solution. This viscous gelling solution is subsequently co-extruded whereby the gelling solution is forming the external layer of an extruded strand of food dough. The invention also relates to a viscous gelling solution obtainable by such method as well as a system for co-extrusion of food products.

24 Claims, 2 Drawing Sheets

METHOD FOR PREPARING FOOD PRODUCTS BY MEANS OF CO-EXTRUSION, VISCOUS GELLING SOLUTION AND SYSTEM FOR CO-EXTRUSION OF FOOD PRODUCTS

BACKGROUND

The present invention relates to method for preparing food products by means of co-extrusion, comprising the steps of: a) providing at least two casing material components; each of which components in itself is not suitable for extrusion as an external layer; b) mixing the casing material components provided during processing step a) to make a viscous gelling solution; and c) feeding the viscous gelling solution of processing step b) to the co-extrusion process of a food product to be co-extruded whereby the gelling solution is forming the external layer of an extruded strand of food dough. The invention also relates to a viscous gelling solution obtainable by such method as well as a system for co-extrusion of food products, the system comprising: a co-extrusion unit for extruding a strand of food dough at least partially enclosed by a simultaneously extruded layer of viscous gelling solution, the co-extrusion unit having a food dough inlet and a casing material inlet, and at least one mixing unit for receiving and mixing a plurality of casing material components, which casing material components in themselves are not suitable for extruding a layer of viscous gelling solution, wherein the mixing unit is provided with at least two casing material component supplies and a viscous gelling solution outlet, and wherein the viscous gelling solution outlet of the mixing unit is connected to the casing material inlet of the co-extrusion unit.

SUMMARY

In the preparation of food products by means of co-extrusion, and more specific in the production of sausages, a strand of food dough is extruded together with the extrusion of an external layer of viscous gelling solution. The viscous gelling solution that, as a result, at least partially encloses the strand of food dough is subsequently treated (hardened) to form the casing of the food product (sausage). For the casing material, use may be made of various viscous gelling solutions, which dependent on the product to be produced, are ordered from a specialised producer of such gelling solutions.

The problem to be solved is to enhance the control and the economics of the co-extrusion process of food products as well as to enhance the control of quality and the cost price of the co-extruded food products while maintaining the prior art advantages of the co-extrusion of food products.

As a solution the present invention provides a method for preparing a casing material used in a co-extruding process of a food product as mentioned in the introduction above wherein the time range of the time window between the moment of mixing of the casing material components to make the viscous gelling solution and the moment of the co-extrusion of the viscous gelling solution is a time window (period) within a time range of [0, 48] hours to maintain the viscoelasticity of the viscous gelling solution at the moment of the co-extrusion within a predetermined range such that the grammage of the external layer of the food product prepared does not exceed 200 g/m². Viscoelasticity is the property of materials that exhibit both viscous and elastic characteristics when undergoing deformation. Viscous materials, like honey, resist shear flow and strain linearly with time when a stress is applied. For testing the viscoelasticity of the viscous gelling solution, broadband viscoelastic spectroscopy (BVS) and resonant ultrasound spectroscopy (RUS) may be used.

The inventive insight of the present invention is that the viscoelasticity of a casing material that results from the mixing of at least two casing material components (each of which components in itself is not suitable for extrusion as an external layer) varies (normally decreases) over time after mixing. To enable an economical use of the viscous gelling solution a relative high viscoelasticity is preferred as this enables to provide a relative strong casing with relative small amounts of viscous gelling solution. If and when the mixed viscous gelling solution is used within a specific time window after the moment of the mixing of the at least two casing material components as mentioned before, the relative large viscoelasticity enables the extrusion of a relatively thin layer of casing material while still providing a casing with sufficient strength as a the viscoelasticity of the viscous gelling solution at the moment of the co-extrusion is thus maintained above a set minimum viscoelasticity value. Due to the relative thin layer of viscous gelling solution necessary, the relative amount of viscous gelling solution for each food product may be limited and thus the material costs of the co-extruded food products may be limited relative to the prior art techniques wherein an excess of viscous gelling solution has to be used to be sure the co-extruded casing of viscous gelling solution has enough strength for the further processing of the co-extruded food product as well as for the desired product specification for the consumer of the co-extruded food product (think e.g. for enough "bite" of co-extruded sausages like Frankfurters). The product specifications are also more consistent from batch to batch (i.e. products manufactured on different days are still very close to each other in desired product specifications). Generally, knowledge (control) of the viscoelasticity of the viscous gelling solution enables a better/enhanced control of the co-extrusion process due to the effect that the characteristics of the viscous gelling solution are well controlled.

The time range of the time window between the moment of mixing of the casing material components to make the viscous gelling solution and the moment of the co-extrusion of the viscous gelling solution may be a time window (period) within a time range of [0, 48] hours, however also another time range may be chosen for instance within [0, 24] hours; within [0, 18] hours; within [1, 48] hours; within [1, 24] hours, within [0, 12] hours and so on. The choice of the time range to be used in specific situations is dependent on various parameters like for instance; the composition of the viscous gelling solution; the composition and other properties of the food dough used; the dimensions of the co-extruded food product; the ambient temperature; the temperature of the vicious gelling solution and the food dough; the atmospheric humidity; production speed and so on.

As already mentioned above, the time range may be chosen such that the viscous gelling solution has a relative high viscoelasticity as this enables to provide a relative strong casing with relative small amounts of viscous gelling solution. The amounts of viscous gelling solution may be expressed in grammage, i.e. the mass of the external layer (the casing of viscous gelling solution) per unit area. Preferably the time window is chosen such that the viscoelasticity of the viscous gelling solution results in a food product wherein the grammage of the external layer does not exceed 200 g/m². Preferably the time window is chosen such that the viscoelasticity of the viscous gelling solution results in a food product wherein the grammage of the external layer does not exceed 150 g/m², more preferred does not exceed 100 g/m². Even more preferred, the time window is chosen such that the viscoelasticity of the viscous gelling solution results in a food product wherein the grammage of the external layer is about [25, 75] g/m².

Alternatively, the amounts of viscous gelling solution may be expressed in weight percentages external layer, wherein the weight percentages of the external layer are calculated based on the total weight of the food product prepared, hereinafter referred to as 'pick up'. In a preferred embodiment of the method according to the present invention the time range of the time window may be chosen such that the viscoelasticity of the viscous gelling solution results in a food product wherein the pick up of the external layer does not exceed 2.5%. More preferably, the time window is chosen such that the viscoelasticity of the viscous gelling solution results in a food product wherein the pick up of the external layer does not exceed 2.0%. Even more preferred, the time window is chosen such that the viscoelasticity of the viscous gelling solution results in a food product wherein the pick up of the external layer does not exceed 1.5%. In a further preferred embodiment, the time window is chosen such that the viscoelasticity of the viscous gelling solution results in a food product wherein the pick up of the external layer is about [0.8, 1.5]%.

In a further embodiment of the method according to the present invention, an acidic buffer solution is added to the mixing step b). The acidic buffer solution has a pH in the range of about 2.0 and 5.0. Preferably the pH is in the range of about 2.2 and 4.5, more preferred the pH of the acidic buffer solution is in the range of about 2.4 and 4.0 and even more preferred the pH of the acidic buffer solution is in the range of about 2.6 and 3.5. Most preferably the pH of the acidic buffer solution does not exceed 3.5. It was found that the viscous gelling solution maintains a relative high viscoelasticity for a prolonged time. Consequently, the time range of the time window is increased by adding an acidic buffer solution to the mixing step b) of the method of the present invention without negatively affecting the grammage (or pick up) of the food product to be prepared.

In an embodiment of the method according to the present invention the time range of the time window between the moment of mixing of the casing material components to the viscous gelling solution and the moment of the co-extrusion of the viscous gelling solution is controlled automatically. Alternatively, in another embodiment of the method according the present invention the time range of the time window between the moment of mixing of the casing material components to the viscous gelling solution and the moment of the co-extrusion of the viscous gelling solution is controlled manually.

In one embodiment, one or more of the casing material components provided during processing step a) are chosen from the group consisting of: water, alginate powder, alginate gel, collagen powder, collagen gel, strong acidic solution, weak acidic solution, strong alkaline solution and weak alkaline solution. In this respect the acidic solution and the alkaline solution may also be referred to in combination as "buffer solution". It is further noted that the one or more casing material components may include pre-mixtures of the above-listed casing material components. Preferably, the pre-mixtures are stable and can be stored on site for a prolonged period before being used to form the viscous gelling solution of the present invention. Thus the various casing material components like one or more aqueous media, one or more dry gelling agents, and/or one or more semi-manufactured viscous gelling agents are on site, that is to say close to the food product co-extrusion, mixed to a dedicated composition of the viscous gelling solution that fits the actual co-extrusion process.

In an embodiment the viscous gelling solution comprises collagen. The collagen may be combined with alginate to form a collagen/alginate mixture. Such viscous gelling solution is especially suited to be used in the method according the present invention. During processing step b) at least one dry gelling agent may be added to at least one aqueous medium, in which situation the dry gelling agent may be a powder. As an alternative or in combination it is also possible that during processing step b) at least two semi-manufactured viscous gelling agents are mixed. The present invention is not limited to any specific type of component mixing. As a further alternative for instance it is also possible that during processing step b) at least two dry gelling agents are mixed, and subsequently the mixed composed dry gelling agent is further mixed with an aqueous medium. Thus all suitable types of mixing of material flows are part of the composing of the viscous gelling solution according the present invention; e.g. during one or more subsequent processing step(s) plural flows of dry gelling agents (powders), aqueous media and/or semi-manufactured viscous gelling agents may be mixed together to form a gelling solution used in the co-extrusion process. A further alternative, used alone or in combination with the previous embodiments in composing the viscous gelling solution is to use one or more pre-set (pre-made) gel mixes.

To enable forward regulation (feed-forward regulation) of the properties of the co-extruded food products, information on the properties of one or more of the casing material components may be provided during processing step a) which information then may be used for regulating the proportions of the gel solution components provided for use. The properties of one or more of the casing material components may be provided by measurement on dry gelling agents, aqueous media, semi-manufactured viscous gelling agents and/or the viscous gelling solution. Such measurement may take place in-line or off-line and may be performed manually and/or automatically. The measurements are then utilized to change the composition of the gel solution produced depending upon, for instance, situation dependent information on the properties of one or more of the components used for the composition of the viscous gelling solution and/or environmental conditions (like temperature and/or atmospheric humidity). Information on the properties of the food product to be co-extruded may be measured automatically and/or manually and these measurements may be made off-line or in-line.

To provide even more influence on the properties of the viscous gelling solution the casing material components provided during processing step a) may also comprise an additive that is selected from an emulsifying agent, a buffer solution, a structure improver, a strengthening agent, a thickener agent and/or combinations thereof.

When different types of food products are produced on co-extrusion equipment the viscous gelling solution may be composed according to various pre-set recipes. By e.g. intelligent control by means of a computer controlled system, different types of food products may trigger the use of different compositions of the viscous gelling solution utilizing different pre-set recipes. Such a computer controlled system may be a passive system (receiving input before the production starts), but may also be fed by situation dependent information on the properties of one or more of the casing material components used for the composition of the viscous gelling solution and/or environmental conditions (like temperature or atmospheric humidity). The use of such "recipe-type" of process regulation including a time control system for maintaining the time window between the moment of mixing of the casing material components and the moment of the co-extrusion within a set time window to control the viscoelasticity of the viscous gelling solution at the moment of co-extrusion enables a simple and quick adjustment of the co-extrusion equipment when different types of food products are subsequently to be produced, leading to greater production flexibility, lower production costs and a higher, more consistent product quality. Also measurements on the food dough during production may be utilized as input to the computer controlled system for producing the viscous gelling solution. Thus, should one or more of the properties of the food dough change enough, the computer controlled system may adjust the mixing process accordingly to minimize fluctuations in product properties.

Another alternative is that the mixing of the casing material components to a viscous gelling solution according to processing step b) may comprise a plurality of mixing phases; for example first mixing phase wherein a first dry powder gelling agent is added to an aqueous medium wherein the components are mixed at a relative low speed; a second mixing phase wherein the obtained semi-manufactured viscous gelling agent is mixed at a higher speed than the mixing speed during the first mixing phase, which second mixing phase takes place under a gas pressure of less than 0.2 bar, preferably a gas pressure of less than 0.1 bar, during a period of [2, 4] minutes. The method may, in between the first mixing phase and the second mixing phase, also comprise an intermediate mixing phase wherein a second dry powder gelling agent is added to the semi-manufactured viscous gelling agent resulting from the first mixing phase and the mixing speed during the intermediate mixing phase is higher than during the first mixing phase but lower than during the second mixing phase. As for the period of mixing the obtained aqueous solution during processing step b) positive results are achieved with a time period of [2.5, 3.5] minutes. With such a mixing method viscous gelling solutions may be prepared that have uniform quality and without, or with only very limited, enclosures of air (gas bubbles).

In an embodiment of the present invention, the casing material components are pre-mixed before the mixture of casing material components is provided during step a). Preferably casing material components in dry form are mixed with each other to form a mixture of dry ingredients. Separately other or similar casing material components are mixed with water to form a mixture of wet ingredients. Subsequently both dry and wet ingredients are mixed during process step b) to form the viscous gelling solution and the moment of mixing the dry and wet ingredients triggers the time window up to the co-extrusion that is controlled according the present invention.

In respect of preparing a solution with uniform quality it may also be advantageous to mix the casing material components to a viscous gelling solution including mechanical emulsifying of the mixture, e.g. by dynamic mixing.

To provide a viscous gelling solution with uniform quality that is also stable in the window up to the co-extrusion process the average temperature of the casing material components provided during processing step a) may be [0, 24] ° C.

The method may also comprise the steps of: d) treating the exterior of the food strand with an aqueous salt solution; and e) dividing the food strand into separated parts. This subsequent processing of the co-extruded food product may also benefit from the better controlled conditions of the vicious gelling solution on the moment of co-extruding as this leads to better controlled casing material conditions subsequently and thus to better controlled post co-extrusion processing control.

The present invention also provides the viscous gelling solution obtainable by the method according to any of the preceding claims. For the advantages of such viscous gelling solution reference is made to the advantages mentioned above in relation to the method according the present invention.

The present invention also relates to a system for co-extrusion of food products, as disclosed in the introductory part of the description wherein the system further comprises an intelligent control unit including a timer that controls the time window between the moment of mixing of the casing material components to the viscous gelling solution and the moment of the co-extrusion of this viscous gelling solution as a layer of viscous gelling solution on the strand of food dough, wherein the time window is within a time range of [0, 48] hours such that the grammage of the external layer of the food product prepared does not exceed 200 g/m$^2$. With this system, the method according the present invention can be realised. Due to a time control unit operably connected to the co-extrusion unit and the mixing unit the time between the mixing of viscous gelling solution and the co-extrusion of the food products is to be controlled. For the advantages of such system reference is made to the advantages already mentioned in relation to the method according the present invention.

The control unit may also comprise a memory with stored pre-set time windows to the time window between mixing and co-extrusion for various viscous gelling solution preparation recipes. The recipes may also control other process conditions like for instance the (mixing) speed(s), processing times and temperatures. The interface may be operable by a human operator for manual setting a specific recipe. As a further alternative, the system may also comprise at least one sensor and the interface may receive input from the sensor. Such sensor may detect information relating to the output and/or input of the co-extrusion unit which information may be used by the control unit to change one or more process conditions and/or one or more casing material component feeds.

BRIEF DESCRIPTION OF THE DRAWINGS

The present invention will be further elucidated on the basis of the non-limitative exemplary embodiments shown in the following figures. Herein.

DETAILED DESCRIPTION OF VARIOUS EMBODIMENTS

Figure 1:
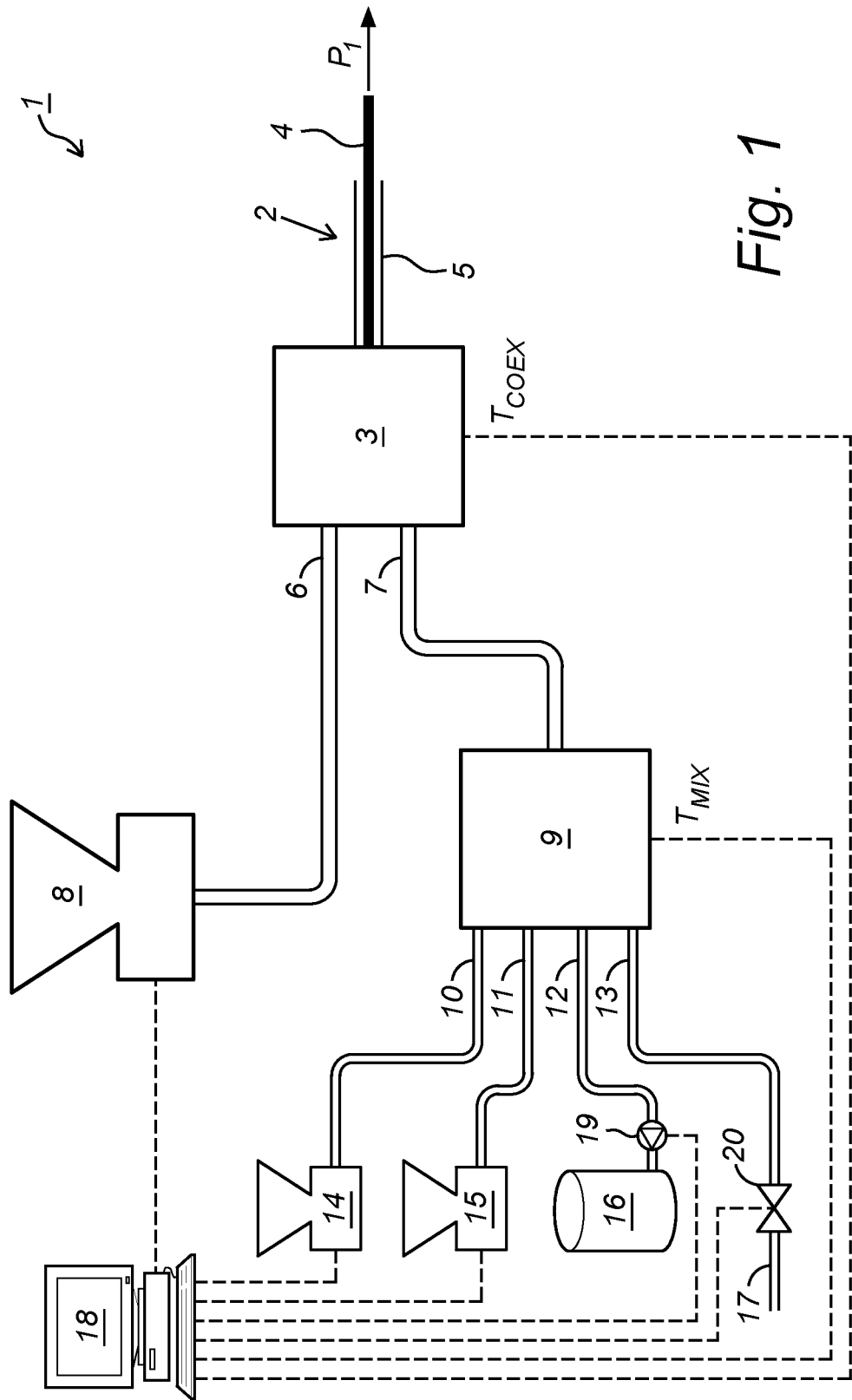
FIG. 1 shows a schematic view on a system for co-extrusion of food products according the present invention.

FIG. 1 shows an in-line system 1 for co-extrusion (P1) of food products 2 (e.g. sausages). The system comprises a co-extrusion unit 3 for extruding a strand of food dough 4 enclosed by a simultaneously extruded layer of viscous gelling solution 5. The co-extrusion unit 3 has a food dough inlet 6 and a viscous gelling solution inlet 7. The food dough inlet 6 connects to a food dough feeder 8 (e.g. a meat mass hopper), for example via a pump (not shown), while the viscous gelling solution inlet 7 connects (in-line) to a mixing unit 9 for the preparation of the viscous gelling solution (casing material), for example via a pump (not shown). The mixing unit 9 is fed by a plurality of casing material supplies 10-13, each providing a different type of casing material component. It is however also possible that two (or even more) casing material supplies 10-13 feed an identical casing material component for instance to enable continuous feed of the specific casing material component from holders/drums/packages that require exchange. In the figure shown two material supplies 10, 11 connect to casing material component hoppers 14, 15 that e.g. can feed a dry powder casing material components, a third material supply 12 that connects to a drum 16 for feeding a liquid casing material component and a fourth material supply 13 that connects to a pipe 17 (e.g. a water pipe) to feed a further liquid (e.g. water). In the mixing unit 9 a selected number of the possible casing material components are mixed to a viscous gelling solution with specific process conditions at a moment in time $T_{mix}$. The moment when the mixed viscous gelling solution is extruded in the co-extrusion unit is moment $T_{coex}$. For operating the system 1 a control unit 18 is provided that connects to the co-extrusion unit 3, food dough feeder 8, mixing unit 9, casing material component hoppers 14, 15, a pump 19 connecting to drum 16 and a valve 20 in the pipe 17. The control unit 18 regulates the mixing operation to produce the viscous gelling solution from the various casing material components to be fed to the co-extrusion unit 3. With the control unit 18 the time window between the moment of mixing of the viscous gelling solution ($T_{mix}$) and the moment of co-extrusion of food products 2 ($T_{coex}$) is controlled within a within a set time window to maintain the viscoelasticity of the viscous gelling solution at the moment of the co-extrusion within a predetermined range.

Figure 2:
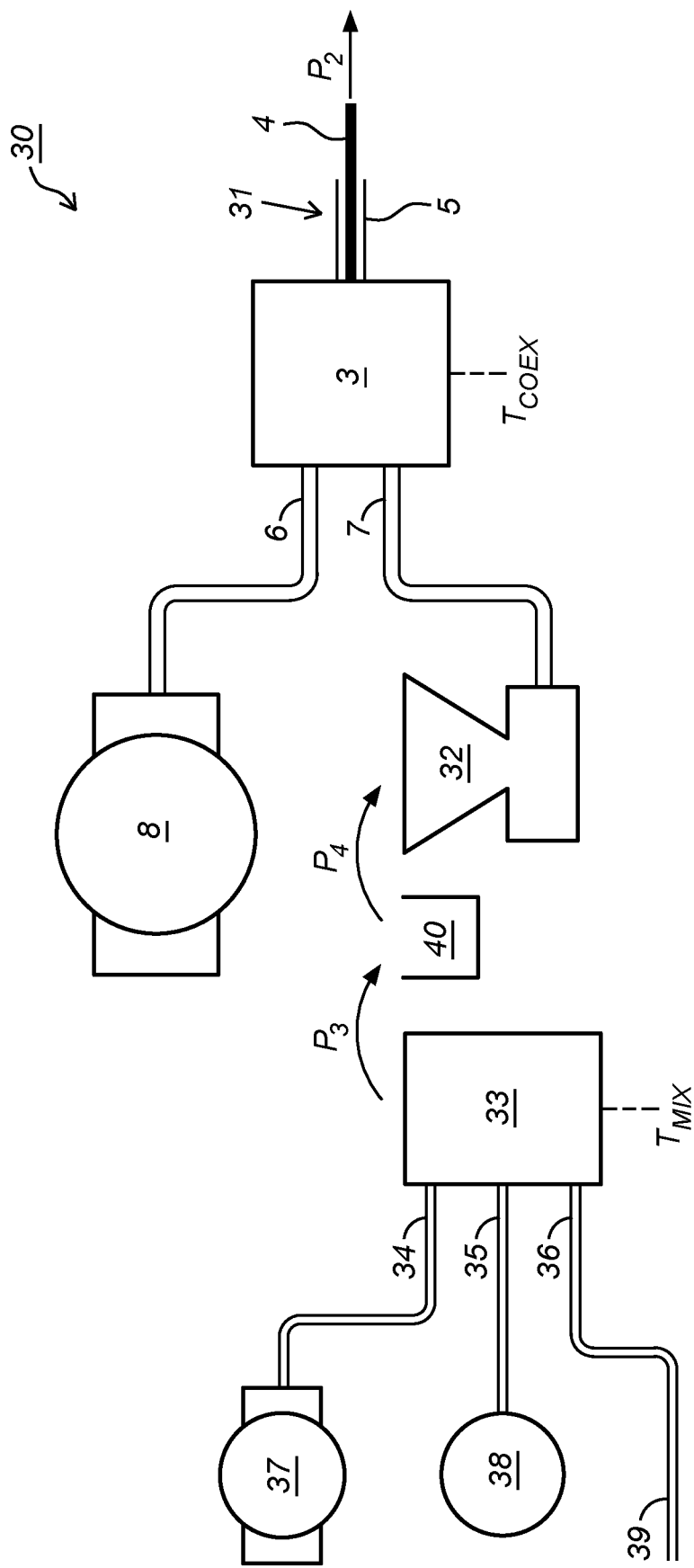
FIG. 2 shows a schematic top view on an alternative embodiment of a system for co-extrusion of food products according the present invention.

FIG. 2 shows a schematic top view on an alternative embodiment of a system 30 for co-extrusion (P2) of food products 31 wherein the reference signs to parts that correspond with parts of the system 1 as shown in FIG. 1 are referred to with identical reference signs. The system 31 comprises a co-extrusion unit 3 for extruding a strand of food dough 4 enclosed by a layer of viscous gelling solution 5. The co-extrusion unit 3 has a food dough inlet 6 and a casing material inlet 7. The food dough inlet 6 connects to a food dough feeder 8 (e.g. a meat mass hopper) while the viscous gelling solution inlet 7 connects to a viscous gelling solution feeder 32. The viscous gelling solution fed to the viscous gelling solution feeder 32 is pre-mixed in a separate mixing unit 33 which is off line with the co-extrusion unit 3. The separate mixing unit 33 is fed by three casing material supplies 34-36, each providing a different type of casing material component. Two of the material supplies 34, 35 connect to casing material component hoppers 37, 38, a third material supply 36 connects to a pipe 39 (e.g. a water pipe) to feed a further liquid (e.g. water). The viscous gelling solution mixed in the separate mixing unit 33 may be fed in batches 40 (see arrows $P_3$, $P_4$) to the co-extrusion unit 3. The time to be controlled according the present invention in this system 30 for co-extrusion (P2) of food products 31 is the moment of mixing of the viscous gelling solution ($T_{mix}$) in the separate mixing unit 33 to the moment of co-extruding the strand of food dough 4 enclosed by a layer of viscous gelling solution 5 in the co-extrusion unit 3.

The invention claimed is:

1. A method for preparing food products by means of co-extrusion, comprising the steps of:
    a) providing at least two casing material components comprising at least two dry gelling agents; each of which at least two casing material components in itself is not suitable for extrusion as an external layer;
    b) mixing the at least two casing material components comprising the at least two dry gelling agents provided during processing step a) to make a gelling solution; and
    c) feeding the gelling solution of processing step b) to the co-extrusion process of a food product to be co-extruded wherein the gelling solution forms the external layer of an extruded strand of food dough;
    wherein a time range of a time window is defined between 1 and 48 hours, the time window being defined between a moment of mixing of the gelling solution in a separate mixing unit to a moment of co-extrusion of the extruded strand of food dough, to maintain the viscoelasticity of the gelling solution at the moment of the co-extrusion within a predetermined range such that the grammage of the external layer of the food product prepared does not exceed 200 g/m2;
    wherein during the processing step b) an acidic buffer solution is added, the acid buffer solution having a pH between about 2.0 and 5.0;
    wherein during the processing step b) the at least two dry gelling agents are mixed to form a dry gelling agent mix, and subsequently the dry gelling agent mix is mixed with an aqueous medium;
    wherein during the processing step b) a control unit regulates a first dry gelling agent hopper and a second dry gelling agent hopper corresponding to the at least two dry gelling agents, respectively, and a mixing unit separate from and upstream of a co-extrusion unit to maintain the viscoelasticity of the gelling solution at the moment of the co-extrusion;
    wherein the control unit regulates the time window between the moment of mixing of the at least two casing material components to make the gelling solution and the moment of the co-extrusion of the gelling solution to maintain the viscoelasticity of the gelling solution;
    wherein the control unit regulates a pick-up of the external layer to not exceed 2.5%;
    wherein the mixing of the casing material components to the gelling solution according to the processing step b) comprises plural mixing phases; a first mixing phase wherein a first dry powder gelling agent is mixed with an aqueous medium wherein the components are mixed at a lower speed; a second mixing phase wherein includes an obtained viscous gelling solution is mixed at a higher speed than the mixing speed during the first mixing phase, which second mixing phase takes place under a gas pressure of less than 0.2 bar during a period of 2-4 minutes.

2. The method according to claim 1, wherein the grammage of the external layer of the food product prepared does not exceed 150 g/m2.

3. The method according to claim 1, wherein the grammage of the external layer of the food product prepared is between about 25 and 75 g/m2.

4. The method according to claim 1, wherein the time range of the time window between the moment of mixing of the at least two casing material components to make the gelling solution and the moment of the co-extrusion of the gelling solution is a time window within a time range between 1 and 24 hours.

5. The method according to claim 1, wherein the time range of the time window between the moment of mixing of the at least two casing material components to the gelling solution and the moment of the co-extrusion of the gelling solution is controlled automatically.

6. The method according to claim 1, wherein one or more of the at least two casing material components provided during processing step a) is chosen from the group consisting of: water, alginate powder, alginate gel, collagen powder, collagen gel, strong acidic solution, weak acidic solution, strong alkaline solution and weak alkaline solution.

7. The method according to claim 1, wherein the gelling solution comprises alginate.

8. The method according to claim 1, wherein information on properties of one or more of the casing material components provided during processing step a) is used for regulating proportions of the casing material components provided.

9. The method according to claim 1, wherein information on properties of the food dough and/or the food product to be co-extruded is measured automatically and inputted to a computer controlled system.

10. The method according to claim 1, wherein information on properties of the food dough and/or the food product to be co-extruded is measured manually and inputted to a computer controlled system.

11. The method according to claim 1, wherein the at least two casing material components provided during the processing step a) comprise an additive that is selected from an emulsifying agent, a structure improver, a strengthening agent, a thickener agent and/or combinations thereof.

12. The method according to claim 1, wherein the gelling solution is composed according to a pre-set recipe.

13. The method according to claim 1, wherein the mixing of the at least two casing material components to a gelling solution during the processing step b) comprises mechanical emulsifying of the gelling solution.

14. The method according to claim 1, wherein an average temperature of the at least two casing material components provided during the processing step a) is between 0 to 24° C.

15. The method according to claim 1, wherein the method also comprises the steps of:
  d) treating an exterior layer of the food strand with an aqueous salt solution; and
  e) dividing the food strand into separated parts.

16. The method according to claim 1, wherein the method in between the first mixing phase and the second mixing phase also comprises an intermediate mixing phase wherein a second dry powder gelling agent is mixed with the viscous gelling solution resulting from the first mixing phase and the mixing speed during the intermediate mixing phase is higher than during the first mixing phase but lower than during the second mixing phase.

17. The method according to claim 1, wherein the period of mixing the obtained viscous gelling solution during the processing step b) is 2.5-3.5 minutes.

18. A gelling solution obtainable by the method according to claim 1.

19. The method according to claim 1, wherein the at least two dry gelling agents comprise one or a combination of alginate powder and collagen powder and the aqueous medium is one or a combination of water, alginate gel, collagen gel, strong acidic solution, weak acidic solution, strong alkaline solution, and weak alkaline solution.

20. The method according to claim 1, wherein the viscoelasticity is determined using either broadband viscoelastic spectroscopy or resonant ultrasound spectroscopy.

21. The method according to claim 1, wherein the control unit maintains the viscoelasticity by controlling a time between mixing and co-extrusion between 1 and 24 hours.

22. The method of claim 1, wherein a third material supply connects to a drum for feeding a liquid casing material component to the mixing unit to mix with the first and second casing components.

23. The method of claim 22, wherein a fourth material supply connects to a pipe to feed water to the mixing unit to mix with the first and second casing components and the liquid casing material.

24. The method of claim 1, wherein the viscous gelling solution is mixed in the mixing unit and fed in batches to the co-extrusion unit via a viscous gelling solution feeder whereat the processing step c) is executed, wherein the mixing unit receives and mixes the first and second casing material components and a liquid casing material component, said liquid casing material component being fed to the mixing unit by a pipe.

* * * * *